(12) United States Patent
Kim et al.

(10) Patent No.: US 7,531,763 B1
(45) Date of Patent: May 12, 2009

(54) VEHICLE EQUIPPED WITH SHIFT LEVER SET

(75) Inventors: Eun Sik Kim, Daegu (KR); Seung Gyu Cho, Hwaseong (KR); Yang Rae Cho, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/107,245

(22) Filed: Apr. 22, 2008

(30) Foreign Application Priority Data

Dec. 11, 2007 (KR) ...................... 10-2007-0128358

(51) Int. Cl.
*H01H 9/06* (2006.01)
*H01H 15/06* (2006.01)

(52) U.S. Cl. .............. 200/61.88; 200/16 D; 200/16 DA

(58) Field of Classification Search ...... 200/16 R–16 D, 200/17 R, 18, 61.54, 61.28, 61.27, 61.3, 61.85, 200/61.88, 561–563, 252, 335
See application file for complete search history.

(56) References Cited

U.S. PATENT DOCUMENTS

| | | | | |
|---|---|---|---|---|
| 5,231,254 A | * | 7/1993 | Baker et al. .............. 200/61.91 |
| 5,544,274 A | * | 8/1996 | Walker et al. .............. 388/838 |
| 5,811,747 A | * | 9/1998 | Taniguchi et al. ......... 200/61.88 |
| 5,875,884 A | * | 3/1999 | Tomotoshi .................. 200/252 |
| 5,902,975 A | * | 5/1999 | Coulson et al. .......... 200/61.91 |
| 6,064,016 A | * | 5/2000 | Muzslay ..................... 200/242 |
| 6,268,575 B1 | * | 7/2001 | Hayase .................... 200/61.27 |
| 6,688,638 B2 | * | 2/2004 | Schutz .................... 280/728.2 |
| 6,872,897 B2 | * | 3/2005 | Otani et al. ............... 200/16 D |
| 6,884,954 B2 | * | 4/2005 | Onodera ..................... 200/339 |
| 7,019,226 B2 | * | 3/2006 | Otani et al. ............... 200/16 D |
| 7,030,326 B2 | * | 4/2006 | Wilsser .................... 200/16 A |
| 7,045,728 B2 | * | 5/2006 | Mitsui ........................ 200/252 |

* cited by examiner

*Primary Examiner*—Michael A Friedhofer
(74) *Attorney, Agent, or Firm*—Morgan, Lewis & Bockius LLP

(57) ABSTRACT

A shift lever set of a vehicle includes a moving member moving by a shift lever, a fixed member facing to the moving member, a terminal electrode assembly formed on one side of the fixed member, and a brush electrode provided on the moving member and electrically connecting the terminal electrode assembly, wherein the terminal electrode assembly be made of silver.

10 Claims, 4 Drawing Sheets

VEHICLE EQUIPPED WITH SHIFT LEVER SET

CROSS-REFERENCE TO RELATED APPLICATION

This application claims priority to and the benefit of Korean Patent Application No. 10-2007-0128358 filed in the Korean Intellectual Property Office on Dec. 11, 2007, the entire contents of which are incorporated herein by reference.

BACKGROUND OF THE INVENTION (a) Field of the Invention

The present invention relates to a shift lever set of a vehicle and, more particularly, a shift lever set that is operated automatically and manually.

(b) Description of the Related Art

Generally, a control finger, a shift lug, a shift rail, and a shift fork are operated by a shift lever such that a shift of a vehicle is performed. The shift lever can operate in a manual and an automatic mode together using a sliding method.

A plurality of terminal electrodes is formed in the shift lever so as to perform the manual mode. The terminal electrodes transfer electrical signals so as to perform grounding and up-shift, down-shift, normal, and so on. A plurality of the terminal electrodes are formed adjacent to each other, and perform shifts according to a moving position of the shift lever.

Also, a brush electrode is formed facing the terminal electrodes. The brush electrode slides on one face on which the terminal electrodes are formed.

That is, a shift up is performed when the brush electrode contacts an electrode having a shift up function, and a shift down is performed when the brush electrode contacts an electrode having a shift down function.

However, when the terminal electrodes are made up of copper, electric shorts and disconnection may occur because, for example, copper can be subject to corrosion or friction. Accordingly, if the terminal electrodes are formed adjacent to each other, electrical noise may occur.

In addition, the brush electrode connected to the terminal electrodes respectively may not be securely assembled, so the brush electrode can be damaged and a shift cannot be performed normally.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a vehicle equipped with a shift lever set having advantages that a short and disconnection are reduced in terminal electrodes and that a brush electrode has a secure combination structure.

A shift lever set of a vehicle, as an exemplary embodiment of the present invention may comprise: a moving member moved by operation of a shift lever; a fixed member configured to face the moving member; a terminal electrode assembly formed on the fixed member; and a brush electrode provided on the moving member and electrically connected to the terminal electrode assembly by slidable operation of the moving member, wherein the terminal electrode assembly is made of silver.

The brush electrode may be made of copper or silver.

The moving member may be coupled to the shift lever by at least a prong.

Further, the brush electrode may comprise: a protruding portion slidably contacts on a surface of the fixed member; a supporting portion extending from the protruding portion and including at least a outwardly-bent section; and an inserted portion extending from the supporting portion and inserted into a groove formed at a portion of the moving portion, wherein a distal end of the inserted portion is connected to one portion of the fixed member through the groove.

The terminal electrode assembly may comprise: a first electrode that is grounded; a second electrode transferring an electrical signal lowering a shift gear ratio; and a third electrode transferring an electrical signal increasing the shift gear ratio.

The terminal electrode assembly may further comprise: a fourth electrode transferring an electrical signal performing auto shift; and a fifth electrode transferring an electrical signal changing automatic mode to manual mode in a transmission.

The thickness of the terminal electrode assembly may be in a range from 10 to 14 μm and preferably about 12 μm.

In another embodiment of the present invention, a shift lever set of a vehicle, may comprises: a moving member moved by operation of a shift lever; a fixed member configured to face the moving member; a terminal electrode assembly formed on the moving member; and a brush electrode provided on the fixed member and electrically connected to the terminal electrode assembly by slidable operation of the moving member, wherein the terminal electrode assembly is made of silver.

The brush electrode may comprises: a protruding portion slidably line-contacting or point-contacts on a face of the fixed member; a supporting portion extending from the protruding portion and including at least a outwardly-bent section; and an inserted portion extending from the supporting portion and inserted into a groove formed at a portion of the moving portion, wherein a distal end of the inserted portion is connected to one portion of the fixed member through the groove.

The brush electrode may include a protruding portion and a supporting portion and the supporting portion is outwardly-bent at least once toward the fixed member.

The terminal electrode assembly may comprise: a first electrode that is grounded; a second electrode transferring an electrical signal lowering a shift gear ratio; a third electrode transferring an electrical signal increasing the shift gear ratio; a fourth electrode transferring an electrical signal performing auto shift; and a fifth electrode transferring an electrical signal changing automatic mode to manual mode in a transmission.

As stated above, the terminal electrode assemblies are made up of silver, so disconnection and shorts are decreased in a vehicle equipped with a shift lever according to an exemplary embodiment of the present invention.

Also, friction and abrasion are reduced between the terminal electrode assembly and the brush electrode.

Further, the brush electrode is securely fixed, so damage is reduced and shifts are performed securely.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
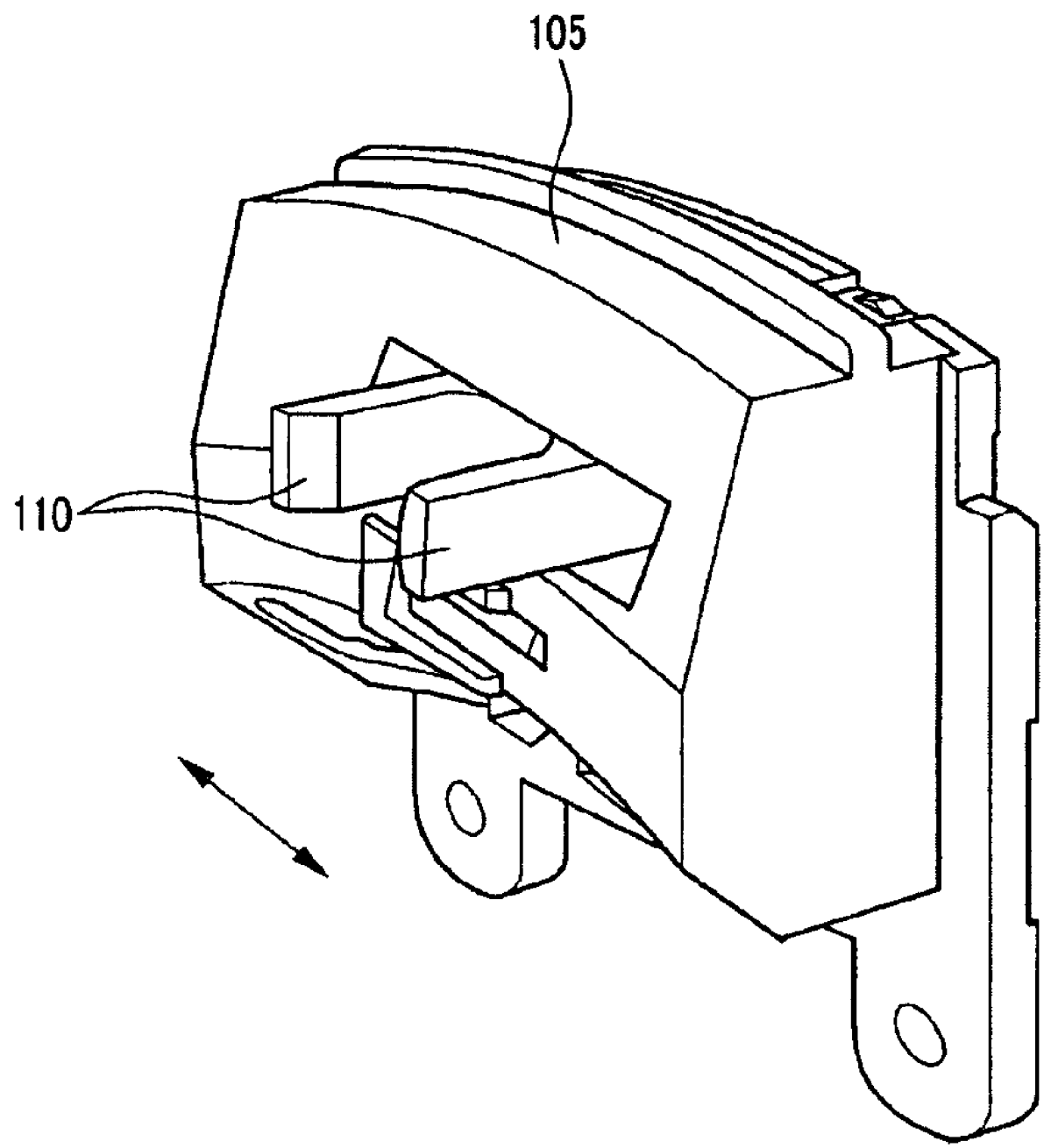
FIG. 1 is a front view of a shift lever set according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

DESCRIPTION OF REFERENCE NUMERALS IN THE DRAWINGS

100: moving member
105: fixed member
110: prong
200: terminal electrode assembly
400: brush electrode
405: protruding portion
420: inserted portion
430: supporting portion
415: receiving hole
425: welded portion A shift lever set is explained in the following according to an exemplary embodiment of the present invention, referring to the accompanying drawings.

FIG. 1 is a front view of a shift lever set according to an exemplary embodiment of the present invention.

Referring to FIG. 1, a shift lever set according to an exemplary embodiment of the present invention includes two prongs 110 attached to a moving member (not shown) and a fixed member 105. A shift lever is coupled to the moving member by the prongs 110.

The moving member moves slidably back and forth by operation of shift lever that a driver manipulates. The moving member can also move to the right and left.

Alternatively, in another embodiment of the present invention, the fixed member 105 can move by the shift lever, and the moving member can be fixed.

A terminal electrode assembly (200, FIG. 2) is formed on one face of the moving member 100, and a brush electrode (400, FIG. 4) electrically connected to the terminal electrode assembly (200, FIG. 2) is provided on one face of the fixed member 105.

Alternatively, in another embodiment of the present invention, the terminal electrode assembly (200, FIG. 2) can be formed on the fixed member 105 and the brush electrode (400, FIG. 4) can be provided on the moving member 100.

A structure of the terminal electrode assembly (200, FIG. 2) and the brush electrode (400, FIG. 4) are explained in detail referring to FIG. 2, FIG. 3, and FIG. 4 hereinafter.

Figure 2:
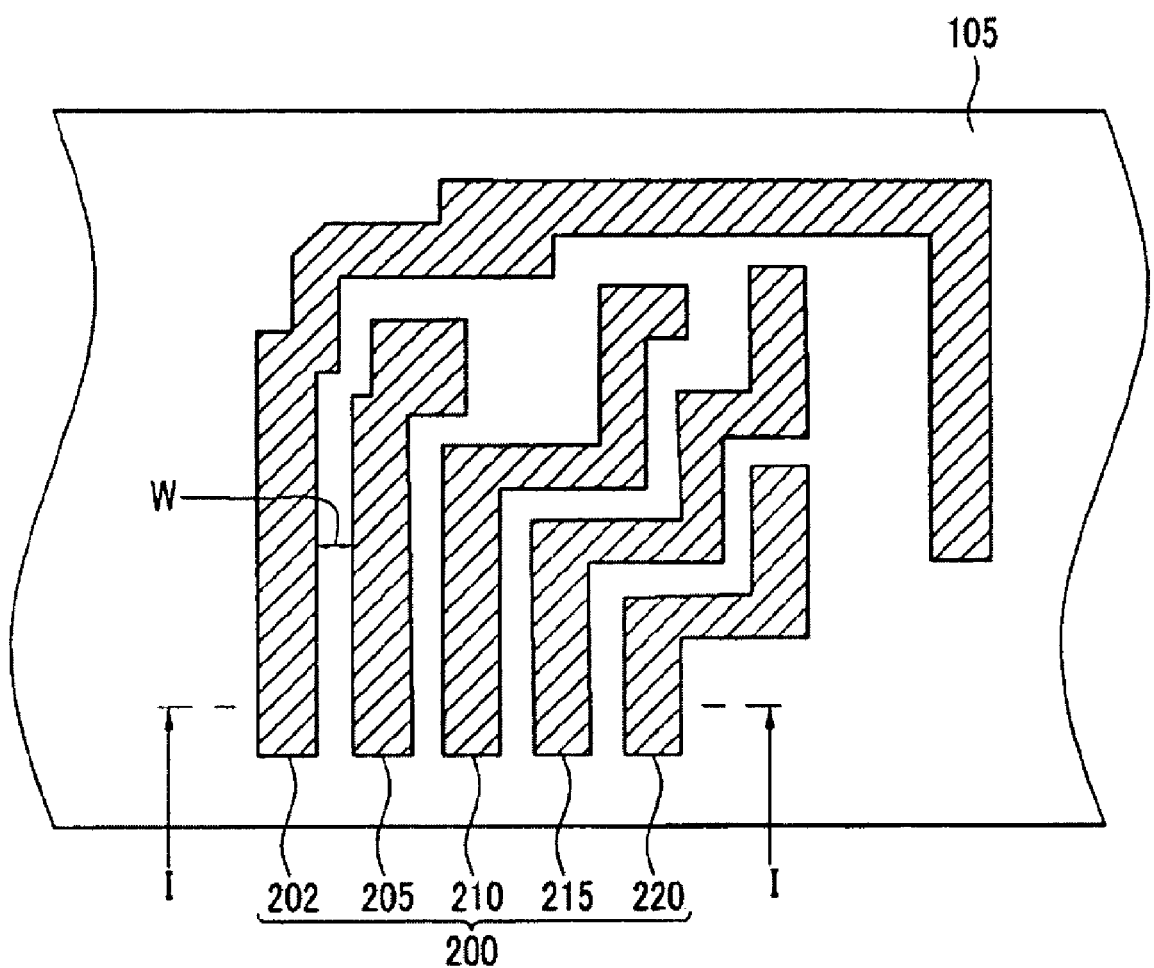
FIG. 2 is a partial top plan view of a fixed member comprising at least a terminal electrode according to an exemplary embodiment of the present invention.

FIG. 2 is a partial top plan view of a fixed member comprising at least a terminal electrode according to an exemplary embodiment of the present invention.

As shown, the terminal electrode assembly 200 may be formed on one side of the fixed member 105. The terminal electrode assembly 200 includes a first terminal electrode 202, a second terminal electrode 205, a third terminal electrode 210, a fourth terminal electrode 215, and a fifth terminal electrode 220.

In one exemplary embodiment, the first terminal electrode 202 may be electrically grounded, and the second terminal electrode 205 transfers an electrical signal that raises a gear ratio of a transmission. Also, the third terminal electrode 210 transfers an electrical signal that lowers a gear ratio of the transmission.

The fourth terminal electrode 215 transfers an electrical signal that causes the transmission to be in a normal mode. Further, the fifth terminal electrode 220 transfers an electrical signal that changes the transmission state from automatic mode to manual mode.

However, the arrangement method of the terminal electrodes can be variously embodied by a person of ordinary skill in the art based on the teachings contained herein.

As an exemplary embodiment of the present invention, the terminal electrode assembly 200 of shift lever set may be made of silver (Ag).

Since the silver (Ag) has the resistance to electricity flowing through it, less than copper and the silver does less corrode than copper, an electrical disconnection or short at the terminal electrodes 202, 205, 210, 215, and 220 is significantly reduced. Accordingly, a width between the electrodes can be decreased.

Further, silver (Ag) has a lubricating characteristic in oneself, so the terminal electrode assembly 200 is hardly damaged.

That is, the shift lever can be designed to be compact.

Figure 3:
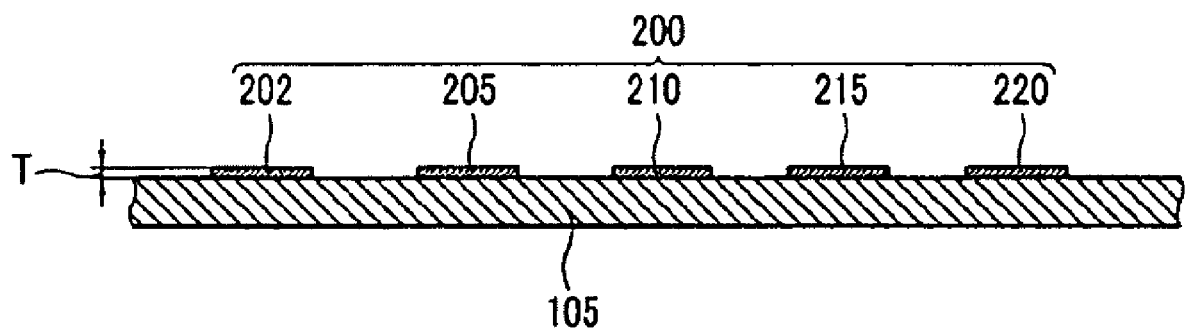
FIG. 3 is a cross-sectional view of the fixed member taken along line I-I of FIG. 2 according to an exemplary embodiment of the present invention.

FIG. 3 is a cross-sectional view of fixed member taken along line I-I of FIG. 2 according to an exemplary embodiment of the present invention.

Referring to FIG. 3, the terminal electrode assembly 200 is formed on a surface of the fixed member 105.

The thickness of the terminal electrodes can be in a range from about 10 μm to about 14 μm and preferably about 12 μm according to manufacturing conditions.

The terminal electrode assembly 200 protrudes on one side of the fixed member 105, referring to FIG. 3. However, the terminal electrode assembly 200 can be formed in a groove (not shown) of the fixed member 105, and may not be protruded on one side of the fixed member 105.

Figure 4:
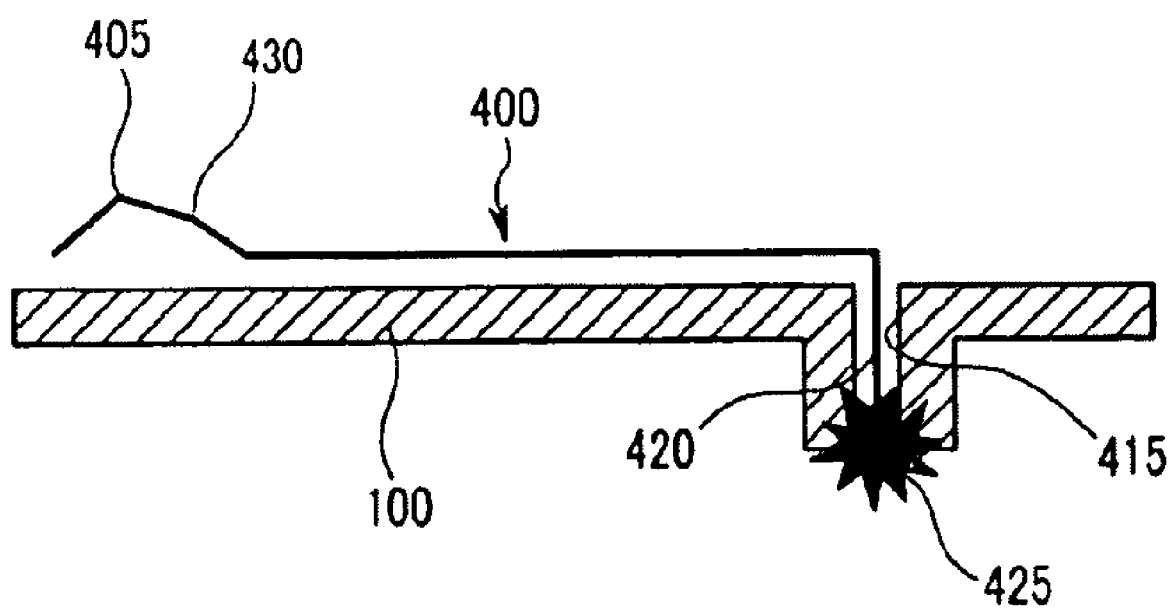
FIG. 4 is a cross-sectional side view of a moving member comprising a brush electrode according to an exemplary embodiment of the present invention.

FIG. 4 is a cross-sectional side view of a moving member comprising a brush electrode according to an exemplary embodiment of the present invention.

Referring to FIG. 4, the brush electrode 400 is formed on the moving member 100.

The brush electrode 400 comprises a protruding portion 405, a supporting portion 430 and an inserted portion 420.

The protruding portion 405 is formed in one distal end portion of the brush electrode 400.

The protruding portion 405 slidably contacts on a surface of the fixed member 105 on which the terminal electrode assembly 200 is formed.

The supporting portion 430 extends from the protruding portion 405 and elastically supports the protruding portion 405.

The supporting portion 430 of the brush electrode 400 is outwardly-bent at least once. The protruding portion 405 can be more securely contacted onto the fixed member 105 since the bent configuration increases contact surface of the protruding portion 405.

Accordingly, the brush electrode 400 and the terminal electrode assembly 200 are securely electrically-connected in sliding motion.

Further, the inserted portion 420 is formed in the other side of the brush electrode 400 wherein the inserted portion 420 extends from the supporting portion 430.

A receiving hole 415 is formed in one side of the moving member 100 and the inserted portion 420 is inserted in the receiving hole 415, by bending a distal end portion of the brush electrode 400.

Also, in an exemplary embodiment, the distal end portion of the inserted portion 420 inserted into the receiving hole 415 is welded to the moving member 100, that is, an inside surface of the receiving hole 415.

Accordingly, a welded portion 425 is formed adjacent to the inserted portion 420 and the receiving hole 415. The welded portion 425 may be formed by ultrasonic welding.

From the above-mentioned configuration, the brush electrode is securely fixed, so damage is reduced and shifts are performed securely.

The brush electrode 400 can be made of copper or silver in the present exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A shift lever set of a vehicle, comprising:
   a moving member moved by operation of a shift lever;
   a fixed member configured to face the moving member;
   a terminal electrode assembly formed on the fixed member, wherein the terminal electrode assembly further comprises a fourth electrode transferring an electrical signal performing auto shift and a fifth electrode transferring an electrical signal changing automatic mode to manual mode in a transmission; and
   a brush electrode provided on the moving member and electrically-connected to the terminal electrode assembly by slidable operation of the moving member, wherein the terminal electrode assembly is made of silver.

2. The shift lever set of a vehicle according to claim 1, wherein the brush electrode is made of copper or silver.

3. The shift lever set of a vehicle according to claim 1, wherein the moving member is coupled to the shift lever by at least a prong.

4. The shift lever set of a vehicle according to claim 1, wherein the brush electrode comprises:
   a protruding portion slidably contacting on a surface of the fixed member;
   a supporting portion extending from the protruding portion and including at least a outwardly-bent section; and
   an inserted portion extending from the supporting portion and inserted into a groove formed at a portion of the moving portion,
   wherein a distal end of the inserted portion is connected to one portion of the fixed member through the groove.

5. The shift lever set of a vehicle according to claim 1, wherein the terminal electrode assembly comprises:
   a first electrode that is grounded;
   a second electrode transferring an electrical signal lowering a shift gear ratio; and
   a third electrode transferring an electrical signal increasing the shift gear ratio.

6. The shift lever set of a vehicle according to claim 1, wherein a thickness of the terminal electrode assembly is in a range from 10 to 14 μm.

7. The shift lever set of a vehicle according to claim 6, wherein the thickness of the terminal electrode assembly is about 12 μm.

8. A shift lever set of a vehicle, comprising:
   a moving member moved by operation of a shift lever;
   a fixed member configured to face the moving member;
   a terminal electrode assembly formed on the moving member, wherein the terminal electrode assembly further comprises a first electrode that is grounded, a second electrode transferring an electrical signal lowering a shift gear ratio, a third electrode transferring an electrical signal increasing the shift gear ratio, a fourth electrode transferring an electrical signal performing auto shift, and a fifth electrode transferring an electrical signal changing automatic mode to manual mode in a transmission; and
   a brush electrode provided on the fixed member and electrically connected to the terminal electrode assembly by slidable operation of the moving member, wherein the terminal electrode assembly is made of silver.

9. The shift lever set of a vehicle according to claim 8, wherein the brush electrode comprises:
   a protruding portion slidably line-contacting or point-contacts on a face of the fixed member;
   a supporting portion extending from the protruding portion and including at least a outwardly-bent section; and
   an inserted portion extending from the supporting portion and inserted into a groove formed at a portion of the moving portion,
   wherein a distal end of the inserted portion is connected to one portion of the fixed member through the groove.

10. The shift lever set of a vehicle according to claim 8, wherein the brush electrode further includes a protruding portion and a supporting portion and the supporting portion is outwardly-bent at least once toward the fixed member.

* * * * *